US010459753B2

(12) United States Patent
Raskar

(10) Patent No.: US 10,459,753 B2
(45) Date of Patent: Oct. 29, 2019

(54) SYSTEM AND METHOD FOR AGENT BASED CENTRALIZED AND EFFICIENT TRANSACTION RECORDINGS FOR SERVICE VIRTUALIZATION

(71) Applicant: Cognizant Technology Solutions India Pvt. Ltd.

(72) Inventor: Hemant Raskar, Pune (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 46 days.

(21) Appl. No.: 15/719,994

(22) Filed: Sep. 29, 2017

(65) Prior Publication Data

US 2018/0341508 A1   Nov. 29, 2018

(30) Foreign Application Priority Data

May 26, 2017   (IN) .............................. 201741018568

(51) Int. Cl.
*G06F 9/455* (2018.01)
*G06F 9/48* (2006.01)
(Continued)

(52) U.S. Cl.
CPC .......... *G06F 9/45558* (2013.01); *G06F 9/466* (2013.01); *G06F 9/4856* (2013.01);
(Continued)

(58) Field of Classification Search
CPC .................................................. G06F 9/45533
(Continued)

(56) References Cited

U.S. PATENT DOCUMENTS 6,256,676 B1 * 7/2001 Taylor .................... G06F 9/465
709/246
9,237,188 B1 * 1/2016 Gabrielson ............. H04L 67/10
(Continued)

FOREIGN PATENT DOCUMENTS

JP   2012118827 A   6/2012
JP   2013254337 A   12/2013

OTHER PUBLICATIONS

Data Aggregation System (DAS)—A system for Virtual Data Service Integration, URL: http://dasdev-vidma.readthedocs.io/en/latest/; Feb. 5, 2014.
(Continued)

*Primary Examiner* — Mehran Kamran
(74) *Attorney, Agent, or Firm* — Cantor Colburn LLP

(57) ABSTRACT

A system, computer-implemented method and computer program product for agent based transaction recordings for service virtualization is provided. The system comprises a proxy manager configured to receive a request from one or more proxy agents for registration. The system further comprises one or more smartstub clients configured to provide one or more options for selecting one or more proxy agents from a list of registered proxy agents and receiving service information. Furthermore, the one or more selected proxy agents configured to record simultaneously, each of the one or more service transactions between the one or more service endpoints and the corresponding one or more consumer applications and forward the one or more recorded service transactions to the proxy manager, wherein the proxy manager provides the one or more recorded service transactions to the one or more smartstub clients for service virtualization.

14 Claims, 9 Drawing Sheets

(51) Int. Cl.
    *H04N 21/2543* (2011.01)
    *H04N 21/4402* (2011.01)
    *G06F 9/46* (2006.01)

(52) U.S. Cl.
    CPC ............ *H04N 21/25435* (2013.01); *H04N 21/440218* (2013.01); *G06F 2009/4557* (2013.01); *G06F 2009/45591* (2013.01); *G06F 2009/45595* (2013.01)

(58) Field of Classification Search
    USPC .......................................................... 718/1
    See application file for complete search history.

(56) References Cited

U.S. PATENT DOCUMENTS

| | | | | |
|---|---|---|---|---|
| 9,641,332 | B1* | 5/2017 | Yung | H04L 9/30 |
| 2005/0267892 | A1* | 12/2005 | Patrick | H04L 67/16 |
| 2006/0225064 | A1* | 10/2006 | Lee | G06F 9/465 |
| | | | | 717/168 |
| 2007/0150480 | A1* | 6/2007 | Hwang | G06Q 10/00 |
| 2008/0021918 | A1* | 1/2008 | Rao | G06F 17/3089 |
| 2010/0131654 | A1* | 5/2010 | Malakapalli | H04L 67/08 |
| | | | | 709/227 |
| 2011/0022812 | A1* | 1/2011 | van der Linden | G06F 9/5077 |
| | | | | 711/163 |
| 2011/0067028 | A1* | 3/2011 | Cozart | G06F 21/10 |
| | | | | 718/101 |
| 2011/0314050 | A1* | 12/2011 | Matsubara | G06F 17/30566 |
| | | | | 707/769 |
| 2012/0096460 | A1* | 4/2012 | Sekiguchi | G06F 9/45558 |
| | | | | 718/1 |
| 2013/0232463 | A1* | 9/2013 | Nagaraja | G06F 8/61 |
| | | | | 717/101 |
| 2014/0046848 | A1* | 2/2014 | Radu | G06Q 20/40 |
| | | | | 705/44 |
| 2014/0380307 | A1* | 12/2014 | Zhu | G06F 9/45533 |
| | | | | 718/1 |
| 2016/0105408 | A1* | 4/2016 | Cooper | H04L 45/42 |
| | | | | 726/3 |
| 2016/0125052 | A1* | 5/2016 | Dahan | G06F 17/30566 |
| | | | | 707/705 |
| 2016/0132309 | A1* | 5/2016 | Rajasekhar | G06F 8/60 |
| | | | | 717/102 |
| 2016/0217159 | A1* | 7/2016 | Dahan | G06F 17/30289 |
| 2018/0139307 | A1* | 5/2018 | Gausnnan | H04L 47/70 |
| 2018/0210745 | A1* | 7/2018 | Raheja | G06F 11/3688 |

OTHER PUBLICATIONS

Service virtualization, IBM, URL: https://www-01.ibm.com/software/rational/servicevirtualization/solutions/.

* cited by examiner

SYSTEM AND METHOD FOR AGENT BASED CENTRALIZED AND EFFICIENT TRANSACTION RECORDINGS FOR SERVICE VIRTUALIZATION

FIELD OF THE INVENTION

The present invention relates generally to service virtualization. More particularly, the present invention provides a system and method for agent based centralized and efficient transaction recordings for service virtualization.

BACKGROUND OF THE INVENTION

Service virtualization is an emerging technology which is used across various types of enterprise applications and platforms to create virtual services. Virtual services are created to mimic behavior of business services by recording various business processes/transactions.

Conventionally, various Service Virtualization (SV) tools exist that facilitate creating virtual services. For example, users (developers and testers) send service requests to live service endpoint via a recorder facility provided in the abovementioned SV tools. The recorder facility has a packet capture functionality that monitors the requests and saves request-response data corresponding to the requests. However, the abovementioned SV tools suffer from several disadvantages. For instance, in order to support various business processes/transactions in large service oriented enterprise systems, multiple instances of SV tools are needed. Further, the users need to wait for sending requests and executing test cases in order to record corresponding request response data. Furthermore, data reconciliation is required due to presence of multiple transactions for a particular service request thereby resulting in huge costs and time. In addition, the existing SV tools provide local and client-integrated service data capture functionality and are therefore dependent on purchased client licenses. Also, the data capture functionality and SV tool components are tightly coupled. Further, the existing SV tools do not provide audit trail for recorded transactions which poses security concerns. The abovementioned tools have limitations during concurrent and continuous packet capturing, are not capable of delivering expected concurrency and persistent behavior in enterprise and distributed environment and use non-synchronized methods for capturing different types of data-transactions. The abovementioned SV tools are not flexible while creating virtual services due to lack of capabilities to record transactions originating from multiple distributed sources, different service consumer applications or service testing tools that are being used to develop and test applications in different environments (such as test, production, staged and replicated) and for different purposes (such as functional testing, system testing and negative testing) at the same time. To overcome this inflexibility, effort and cost are incurred for creating stubs for various scenarios due to partial coverage of virtual services created using limited number of recorded transactions.

In light of the abovementioned disadvantages, there is a need for a system and method for agent based centralized and efficient transaction recordings for service virtualization. Further, there is a need for a system and method that is capable of explicit and implicit recording of service transactions. Furthermore, there is a need for a system and method that provides the users freedom and flexibility to record and execute multifaceted service transactions, facilitate simultaneous recordings and auto-reconciliation. Also, there is a need for a system and method that facilitates the users to record multiple and varied service transactions without the need to procure additional SV tool licenses. In addition, there is a need for a system and method that requires minimal effort during configuration and does not require frequent configuration changes. Further, there is a need for a system and method that provides optimized data transmission, persistent data storage, session based service delegation and management and concurrent recordings of transactions with respect to multiple service endpoints.

SUMMARY OF THE INVENTION

A system, computer-implemented method and computer program product for agent based transaction recordings for service virtualization is provided. The system comprises a proxy manager configured to receive a request from one or more proxy agents for registration. The system further comprises one or more smartstub clients configured to provide one or more options for selecting one or more proxy agents from a list of registered proxy agents and receiving service information, wherein the received service information facilitates connection of the one or more selected proxy agents with one or more service endpoints and corresponding one or more consumer applications. Furthermore, the one or more selected proxy agents configured to record simultaneously, each of the one or more service transactions between the one or more service endpoints and the corresponding one or more consumer applications, the one or more service endpoints connected with the one or more selected proxy agents and forward the one or more recorded service transactions to the proxy manager, wherein the proxy manager provides the one or more recorded service transactions to the one or more smartstub clients for service virtualization.

In an embodiment of the present invention, the proxy manager facilitates connection between the one or more smartstub clients and the one or more proxy agents. In an embodiment of the present invention, the proxy manager is further configured to perform functions comprising session management, audit services, monitoring services, data congregation services, data reconciliation services and managing licenses. In an embodiment of the present invention, the service information comprise of at least a protocol specification, an Internet Protocol address of service endpoint, a name of port hosting live service, requisite authentication information and requisite proxy information.

In an embodiment of the present invention, the one or more selected proxy agents facilitate connection between the one or more service endpoints and the corresponding one or more consumer applications. In an embodiment of the present invention, the system further comprising a smartstub server configured to manage the one or more smartstub clients.

In an embodiment of the present invention, each of the one or more service transactions is performed using a specific protocol and service. Further, the specific protocol and service comprise Simple Object Access Protocol (SOAP), Representational State Transfer (REST), Java Message Service (JMS), Java Database Connectivity (JDBC), Remote Method Invocation (RMI), File Transfer Protocol (FTP), Hypertext Transport Protocol (HTTP) and Transport Control Protocol (TCP).

In an embodiment of the present invention, if the one or more proxy agents are not registered with the proxy manager, then the one or more proxy agents act as a pass-through between the one or more service endpoints and the corresponding one or more consumer applications.

The computer-implemented method for agent based transaction recordings for service virtualization, via program instructions stored in a memory and executed by a processor, comprises receiving a request from one or more proxy agents for registration. The computer-implemented method further comprises selecting one or more proxy agents from a list of registered proxy agents. Furthermore, the computer-implemented method comprises receiving service information, wherein the received service information facilitates connection of the one or more selected proxy agents with one or more service endpoints and corresponding one or more consumer applications. Also, the computer-implemented method comprises recording simultaneously each of one or more service transactions between the one or more service endpoints and the corresponding one or more consumer applications, the one or more service endpoints connected with the one or more selected proxy agents. In addition, the computer-implemented method comprises forwarding the one or more recorded service transactions to one or more smartstub clients for service virtualization.

The computer program product for agent based transaction recordings for service virtualization comprising a non-transitory computer-readable medium having computer-readable program code stored thereon, the computer-readable program code comprising instructions that when executed by a processor, cause the processor to receive a request from one or more proxy agents for registration. The processor further selects one or more proxy agents from a list of registered proxy agents. Furthermore, the processor receives service information, wherein the received service information facilitates connection of the one or more selected proxy agents with one or more service endpoints and corresponding one or more consumer applications. Also, the processor records simultaneously each of one or more service transactions between the one or more service endpoints and the corresponding one or more consumer applications, the one or more service endpoints connected with the one or more selected proxy agents. In addition, the processor forwards the one or more recorded service transactions to one or more smartstub clients for service virtualization.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for agent based centralized and efficient transaction recordings for service virtualization is described herein. The invention provides for a system and method that is capable of explicit and implicit recording of service transactions. The invention further provides for system and method that provides the users freedom and flexibility to record and execute service transactions, facilitate simultaneous recordings and auto-reconciliation. Furthermore, the invention provides for a system and method that facilitates the users to record multiple and varied service transactions without the need to procure additional SV tool licenses. In addition, the invention provides for a system and method that requires minimal effort during configuration and does not require frequent configuration changes. Also, the invention provides for a system and method that facilitates optimized data transmission, persistent data storage, session based service delegation and management and concurrent recordings of transactions with respect to multiple service endpoints.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
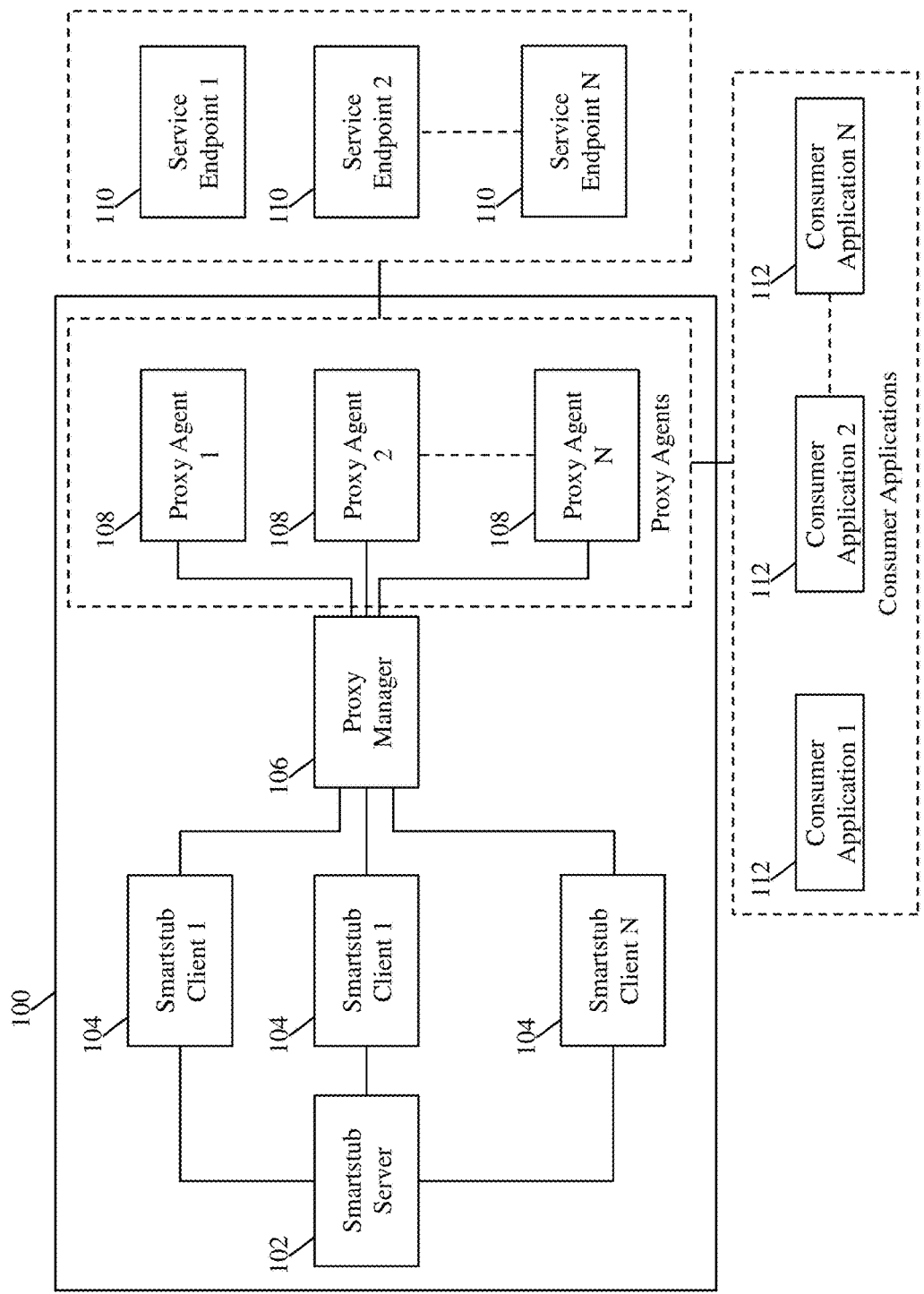
FIG. 1 is a block diagram illustrating a system for agent based centralized and efficient transaction recordings for service virtualization, in accordance with an embodiment of the present invention.

FIG. 1 is a block diagram illustrating a system 100 for agent based centralized and efficient transaction recordings for service virtualization, in accordance with an embodiment of the present invention. The system 100 comprises a smartstub server 102, one or more smartstub clients 104, a proxy manager 106 and one or more proxy agents 108. The one or more proxy agents 108 are configured to facilitate connection between the one or more service endpoints 110 and corresponding one or more consumer applications 112.

The smartstub server 102 is configured to manage the one or more smartstub clients 104 and facilitate communication with other components of the system 100. The one or more smartstub clients 104 are configured to interface with the proxy manager 106. The one or more smartstub clients 104 perform various functions including, but not limited to, initiate recording session, select appropriate proxy manager and agents, provide required information to the proxy manager 106, receive and select recordings and create virtual services. The one or more smartstub clients 104 are registered and connected with the proxy manager 106 once the proxy manager 106 is configured and started.

Figure 1A:
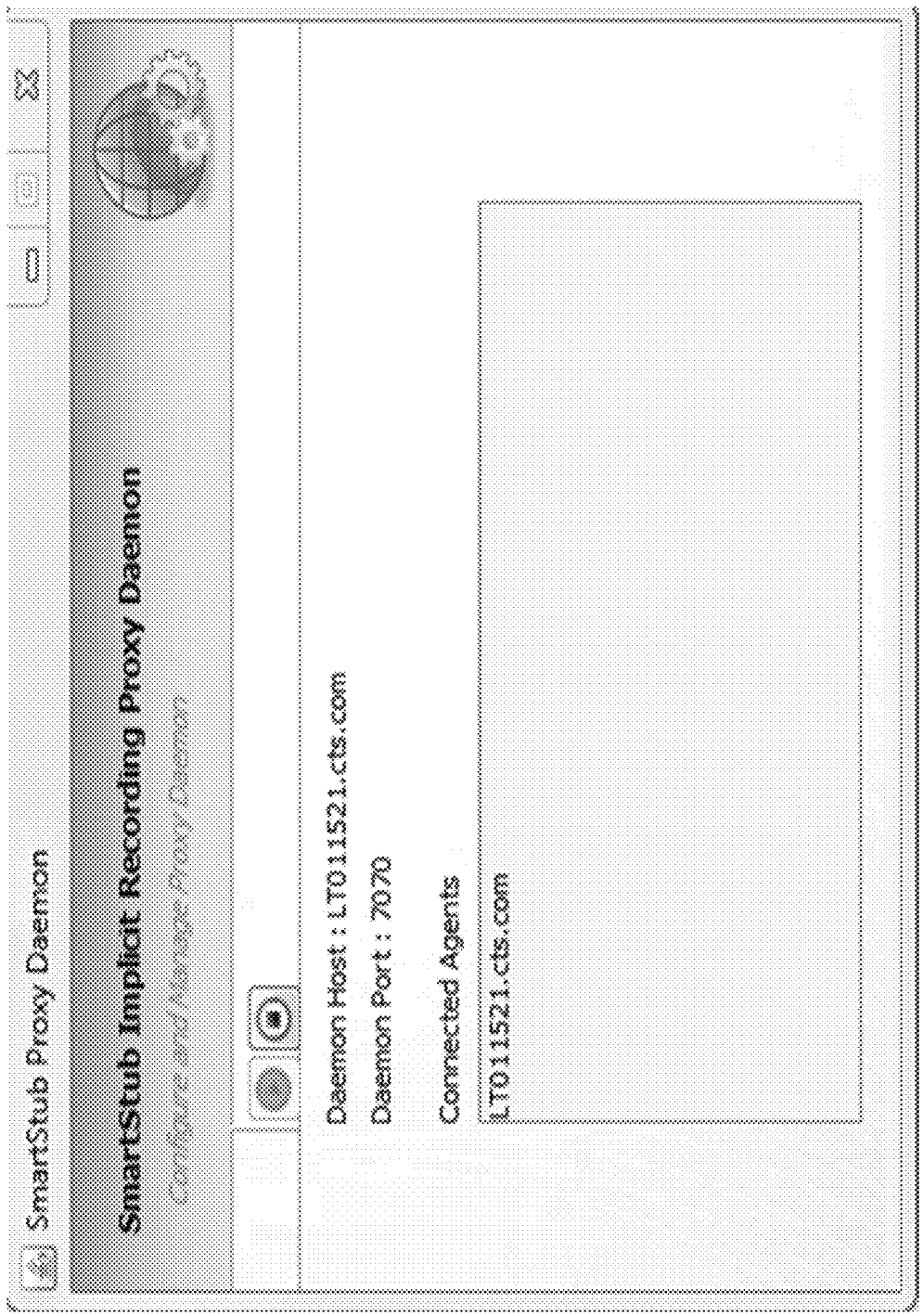
FIG. 1A is a screenshot illustrating a graphical user interface for configuring and managing proxy manager, in accordance with an embodiment of the present invention.

The proxy manager 106 is a service provider that acts as a bridge between the one or more smartstub clients 104 and the one or more proxy agents 108. The proxy manager 106 provides a node-locked process for effective bridging. The proxy manager 106 also performs additional functions and services such as, but not limited to, session management, audit services, monitoring services, data congregation services, data reconciliation services and managing licenses. The proxy manager 106 is capable of deployment and execution on any network-machine irrespective of whether other components of the system 100 are installed on the same network-machine. In an embodiment of the present invention, the proxy manager 106 runs as a background process. The proxy manager is also referred to as proxy daemon. FIG. 1A is a screenshot illustrating a graphical user interface for configuring and managing proxy manager 106, in accordance with an embodiment of the present invention. In another embodiment of the present invention, the proxy manager 106 operates in a non-GUI mode as a service/daemon-process.

The one or more proxy agents 108 facilitate implicit recording of one or more service transactions between the one or more service endpoints 110 and corresponding one or more consumer applications 112 simultaneously. The one or more proxy agents 108 (also referred to as proxy brokers) act as slaves and the proxy manager 106 acts as a master. One or more users (business users, testers and developers) select the one or more proxy agents 108 and provide service information via a user interface provided by the one or more smartstub clients 104. The received service information is used for initiating connection with the one or more selected proxy agents 108. The received service information also facilitates connection of the one or more selected proxy agents with the one or more service endpoints and the corresponding one or more consumer applications. In an embodiment of the present invention, the one or more users select the one or more proxy agents 108 from a list of proxy agents registered with the proxy manager 106. The one or more users are also provided one or more options to initiate recording of the one or more service transactions via the user interface. Once the one or more selected proxy agents 108 are in a running state, the one or more selected proxy agents 108 simultaneously monitor and record each of the one or more service transactions by communicating with the one or more service endpoints 110 and the corresponding one or more consumer application 112 based on the received service information provided by the one or more users. In an embodiment of the present invention, the received service information comprises a protocol specification (such as (http://, https://, Secure Sockets Layer (SSL) information, Simple Object Access Protocol (SOAP), Representational State Transfer (REST) and Remote Method Invocation (RMI)), IP address or host where live service/end point is hosted, port on which live service is hosted, requisite authentication information and requisite proxy information.

The one or more service endpoints 110 are servers that host live services, receive the one or more service transaction requests from the corresponding one or more consumer applications 112 and send back responses. The one or more service endpoints 110 include, but not limited to, SOAP or REST protocol based web-services of http or https, Java Database Connectivity (JDBC connection URLs, RMI connection URLs, Java Messaging Service (JMS) based connection endpoints and the likes. These service end-points 110 are accessed and used by the corresponding one or more consumer applications 112. The one or more consumer applications 112 are preconfigured with the corresponding one or more service endpoints 110. The one or more service endpoints 110 corresponding to a particular consumer application 112 are considered target hosts and are configured by providing target host machine name/IP, port and corresponding service URL. If a particular consumer application 112 needs to be connected with a proxy agent 108 then the target host and target port needs to be updated to machine name/IP and virtual port where the proxy agent 108 is running respectively.

The one or more consumer applications 112 are desktop, mobile or web applications which connect with the corresponding one or more service endpoints 110 using the host-name, port and service URL. The one or more consumer applications 112 include, but not limited to, Applications Under Test (AUT), testing tools and web service based consumer applications. In an embodiment of the present invention, the one or more service endpoints 110 are used for the one or more service transactions. The one or more service transactions are performed using a specific protocol and/or service including, but not limited to, Simple Object Access Protocol (SOAP), Representational State Transfer (REST), Java Message Service (JMS), Java Database Connectivity (JDBC), File Transfer Protocol (FTP), Remote Method Invocation (RMI), Hypertext Transport Protocol (HTTP) and Transport Control Protocol (TCP) to facilitate communication between the one or more service endpoints 110 and the corresponding one or more consumer applications 112. The one or more proxy agents 108 initiate recording of the one or more service transactions from the corresponding one or more consumer applications 112 consuming services from a particular service endpoint 110 as per user's need based on the service information. Further, each of the one or more proxy agents 108 monitors a set of target service endpoints and ports for all requests from the corresponding consumer applications 112. The proxy manager 106 monitors activities of the one or more proxy agents 108 registered and connected with the proxy manager 106. If the one or more proxy agents 108 are not registered and connected to the proxy manager 106, then the one or more proxy agents act as a pass-through between the one or more consumer applications and corresponding one or more service endpoints 110. If the one or more proxy agents 108 are connected to the proxy manager 106, then the one or more proxy agents simultaneously record all the service transactions originating from the one or more consumer applications 112 and forward the same to the proxy manager 108 which are further forwarded to the one or more smartstub clients 104.

Figure 1B:
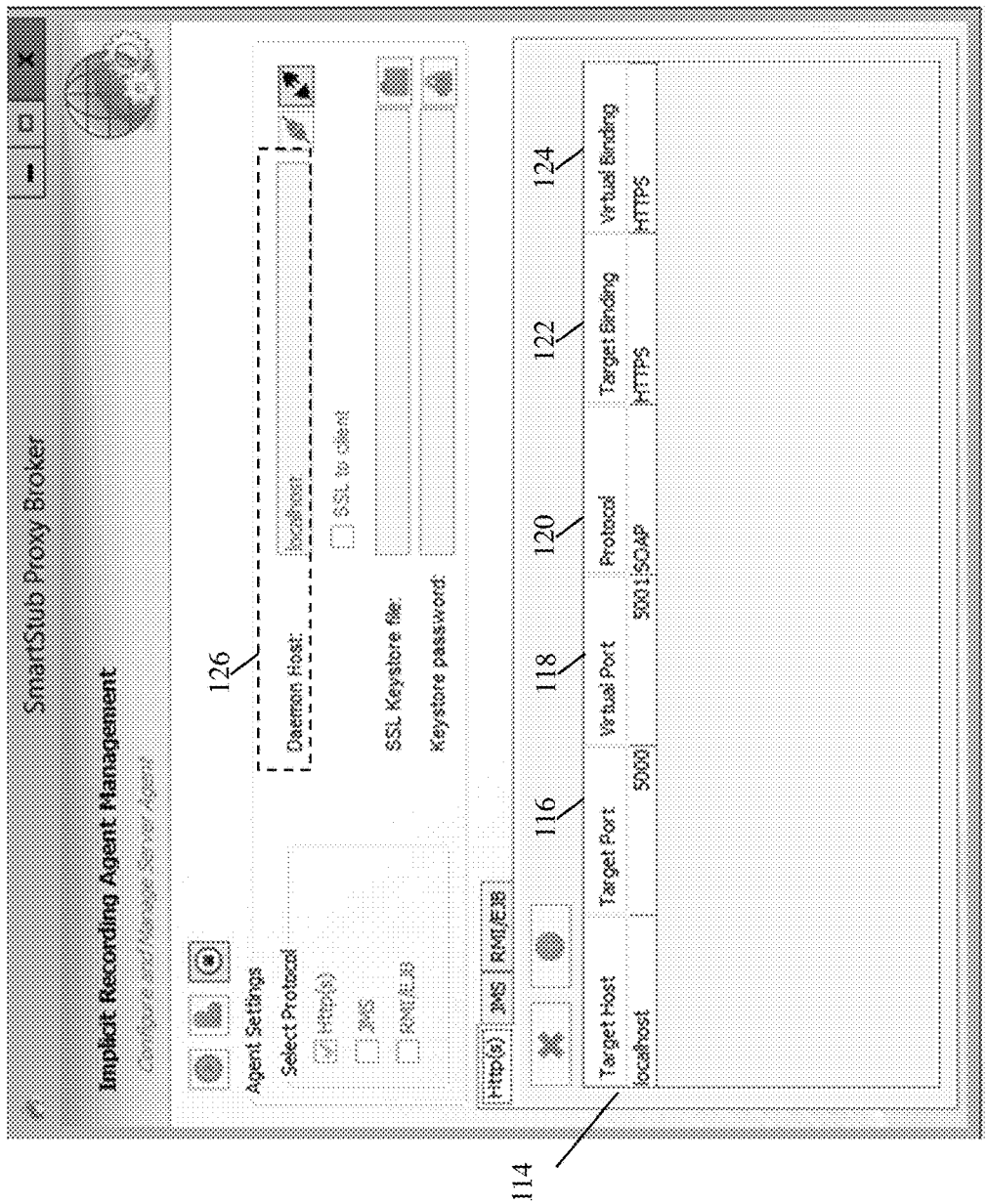
FIG. 1B is a screenshot illustrating a graphical user interface for configuring and managing a proxy agent, in accordance with an embodiment of the present invention.

In an embodiment of the present invention, the one or more proxy agents 108 are enabled to add additional service endpoints based on any protocol type as per user requirement. Further, the one or more proxy agents 108 provide a user interface to enable the one or more users to view links of all the service endpoints 110 in communication with a corresponding proxy agent 108. FIG. 1B is a screenshot illustrating a graphical user interface for configuring and managing a proxy agent, in accordance with an embodiment of the present invention. The target host (114) provides name/Internet Protocol address where live services are hosted. Target port (116) provides port number where live services are hosted on target host. Virtual port (118) provides virtual port number on which proxy agent 108 listens to all requests originating from the consumer application 112. Protocol (120) provides the type of protocol used for service requests/transactions. Target binding (122) and virtual binding (124) provides binding type. The binding type is either http or https in case of web services. Daemon host (126) provides name/Internet Protocol address of machine where proxy manager 106 is installed and running.

In an exemplary embodiment of the present invention, during operation, the one or more users start the proxy manager 106 and the one or more proxy agents 108 residing on same or different machines. The user interface provided by the one or more proxy agents 108 sends a request to the proxy manager 106 for registration. The user configures IP-address and port at which the proxy manager 106 is running at the one or more proxy agents 108. Further, connection request is initiated by the one or more proxy agents 108 either automatically or by the user. On initiation of the connection request, the one or more proxy agents 108 automatically handshakes with the proxy manager 106 for various operations such as, but not limited to, sending registration requests, receiving acknowledgment for the same and updating statuses and modes. Once registered, the proxy manager 106 starts monitoring the registered one or more proxy agents 108. Each registered proxy agent 108 is provided with a unique Identification (ID), for example 'PBI01', 'PBI02' and so on. Further, the unique ID is attached with all the information corresponding to the proxy agent 108. The registered one or more proxy agents 108 are associated with the one or more service endpoints 110 and simultaneously record each of the one or more service transactions corresponding to the associated one or more service endpoints 110 based on the service information provided by the one or more users.

The one or more users then starts one or more smartstub clients 104 and selects implicit recording option for creating virtual services via the user interface provided by the one or more smartstub clients 104. On selecting implicit recording option, the one or more users are prompted to provide details of the proxy manager 106 in the form of IP address and port. Once connected to proxy manager 106, one or more users are prompted to select one or more proxy agents 108 from a list containing the unique IDs of all the proxy agents registered with the connected proxy manager 106. The one or more users select one or more proxy agents 108 from the list to initiate recording and receiving of the one or more service transactions between the one or more service endpoints 110 and the corresponding one or more consumer applications 112. To initiate recording, the one or more users provide the service information comprising, but not limited to, service Uniform Resource Locator (URL), remote service port and virtual port. Further, the service information is provided to the one or more selected proxy agents 108 and the corresponding one or more consumer applications 112. In an embodiment of the present invention, the service URL is live service end-point URL in a format such as, but not limited to, http(s)://service-host-IP-address:service_port/ serviceurltext. The service host IP-address is the IP-address of the host where live service (which is to be recorded) is hosted/present. The "service_port" is network port of the service-host machine on which the live-service is running (also referred to as remote service endpoint port). "Serviceurltext" represents the service URL for example sqlrest/ customer/1. The consumer application 112 connects with the service endpoint 110 URL via the proxy agent 108. The user provides the port referred to as virtual port on which proxy agent 108 listens to all the connections from the consumer application 112. In an exemplary embodiment of the present invention, if the proxy agent 108 is running on IP address 10.223.16.22 and the virtual port configured by the user is 1980 then the consumer application 112 needs to configure end-point URL as http://10.223.16.22:1980/sqlrest/customer/1 which facilitates connection with the corresponding proxy agent 108. On receiving the service information, the proxy agent 108 starts capturing relevant service transactions from the service endpoint 110 associated with the proxy agent 108 based on the received service information. The proxy agent 108 does not record any service transactions unless the complete service response is received by the proxy agent 108 from the service endpoint 110. In an embodiment of the present invention, the one or more proxy agents 108 receive requests from the consumer application 112, forward the same to the service endpoint 110, receive response from the service endpoint 110, validate the same and send it back to the consumer application 112. The one or more proxy agents 108 also record and forward the requests and responses exchanged between the service endpoints 110 and the corresponding consumer applications 112, to the proxy manager 106. In an embodiment of the present invention, a specific proxy agent 108 is capable of performing the abovementioned tasks for one or more service endpoints 110 using one or more protocols. In an embodiment of the present invention, the one or more consumer applications 112 sending requests to the corresponding service endpoints 110 are updated with IDs of the proxy agents 108 using machine name, IP-address and virtual port number. Updating the IDs of the proxy agents 108 at the one or more consumer applications 112 facilitate communication via the proxy agents 108 while the service endpoint URL remains the same to facilitate recording of the one or more service transactions. Further, updating is performed at the time of configuring the system 100 for recording service transactions between the consumer applications 112 and the service endpoints 110.

Figure 1C:
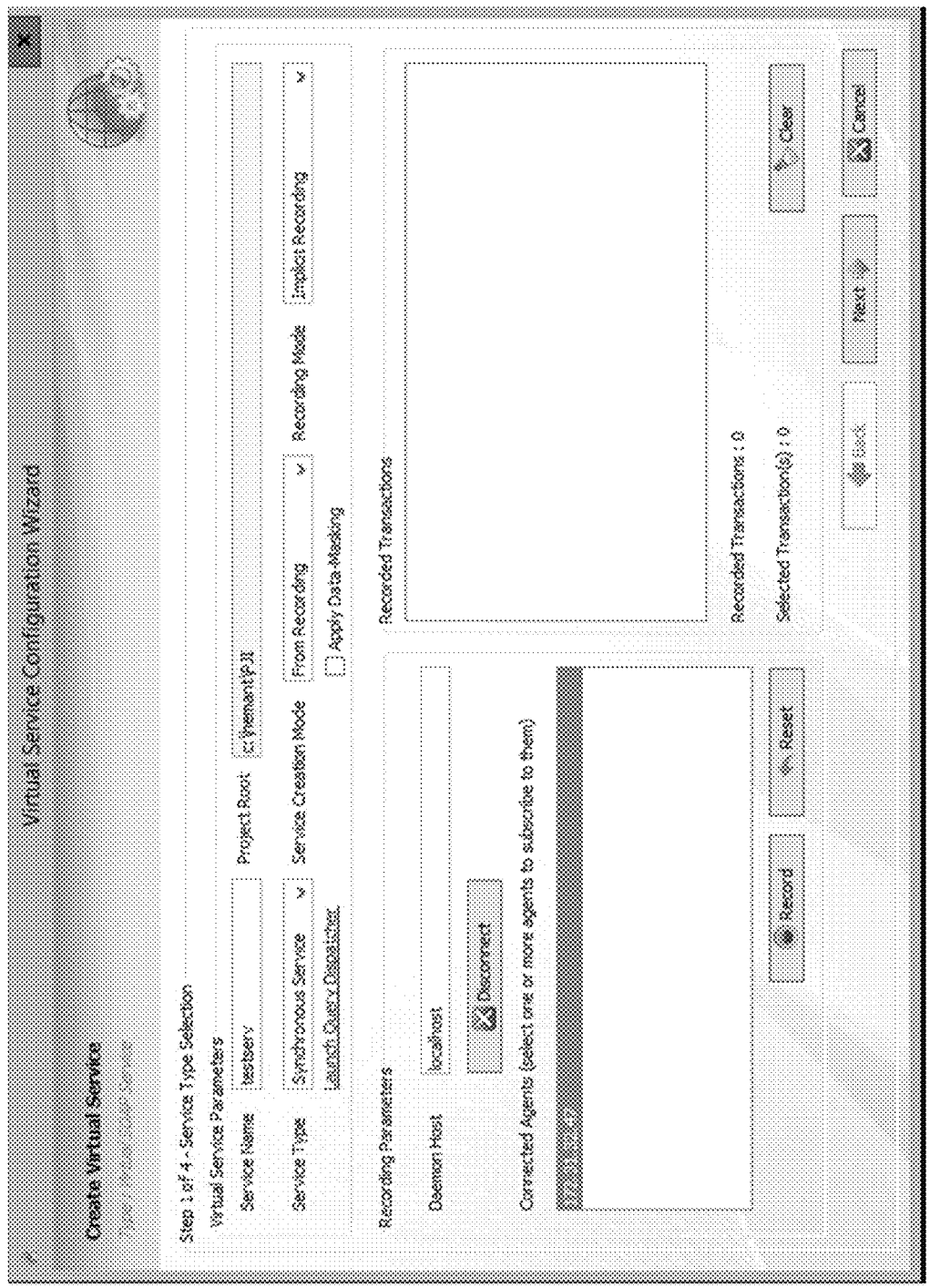
FIG. 1C is a screenshot illustrating a graphical user interface for configuring and selecting a proxy manager and proxy agents respectively and initiating transaction recording sessions, in accordance with an embodiment of the present invention.
Figure 1D:
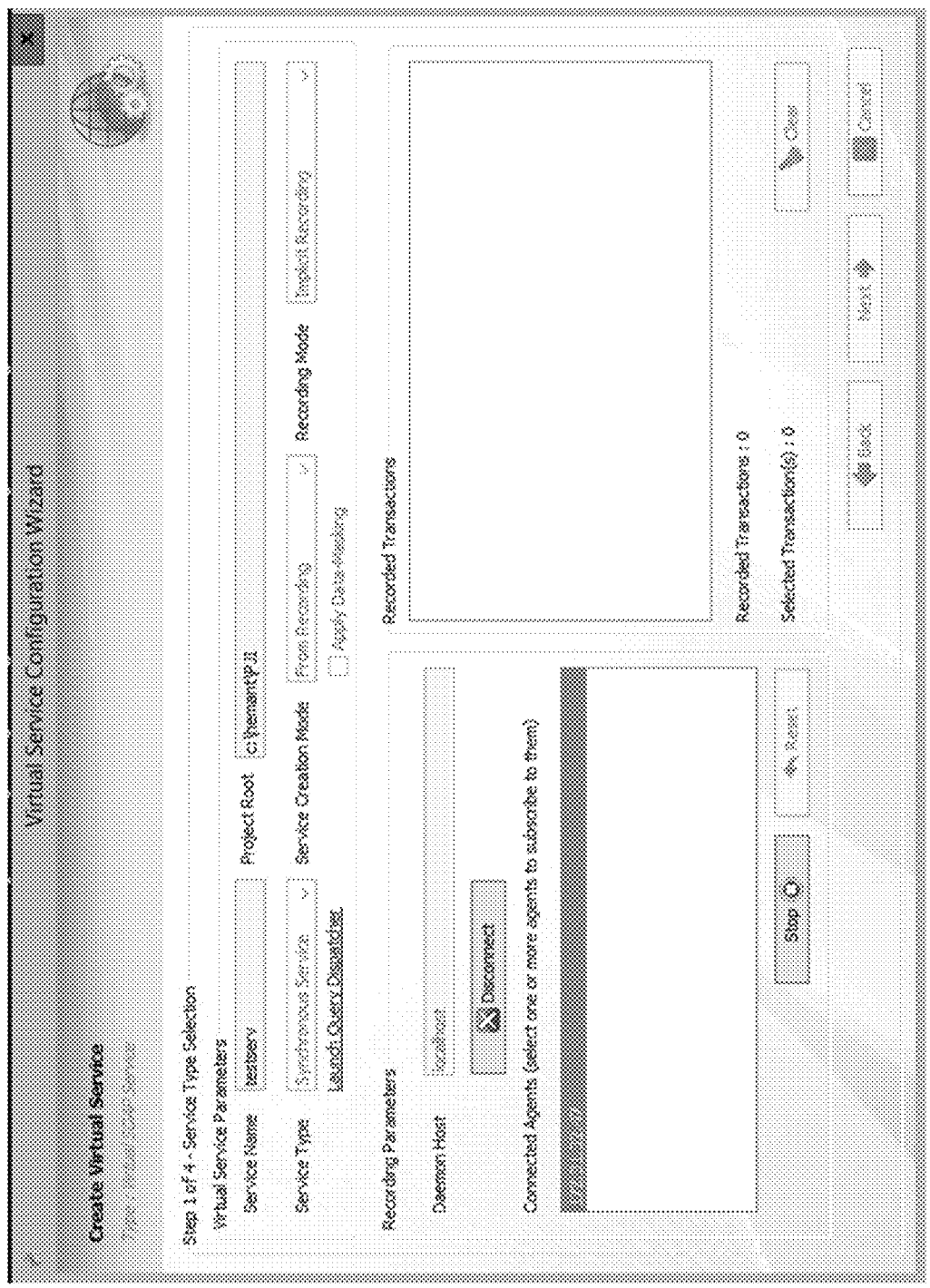
FIG. 1D is a screenshot illustrating a graphical user interface for terminating transaction recording sessions, in accordance with an embodiment of the present invention.

Once the smartstub client 104 completes recording or ends the session, the proxy manager 106 clears the session and communicates with the corresponding proxy agent 108 to stop recording. In an embodiment of the present invention, the one or more users end the session by terminating the recording, closing the session window or by finishing updating of virtual service and moving to next configuration. FIG. 1C is a screenshot illustrating a graphical user interface for configuring and selecting a proxy manager and proxy agents respectively and initiating transaction recording sessions for creating virtual service, in accordance with an embodiment of the present invention. FIG. 1D is a screenshot illustrating a graphical user interface for terminating transaction recording sessions, in accordance with an embodiment of the present invention.

In an embodiment of the present invention, all the information pertaining to recording by the proxy agents 108 for all types of service transactions is shared with the proxy manager 106. The proxy manager 106 organizes, manages and monitors the proxy agents 108 and information provided by the proxy agents 108. The proxy manager 106 also manages session sharing and servicing mechanism for proxy agents 108 that are shared between multiple smartstub clients 104. The proxy manager 106 optimally receives and synchronizes data packets corresponding to the recorded service transactions from each proxy agent 108 for each service endpoint URL configured within the proxy agent 108. Further, the proxy manager 106 segregates, organizes and orchestrates the received data based on proxy agent, data/service type and service request and corresponding response. If requested, the proxy manager 106 provides the segregated, organized and orchestrated data to the one or more users via the one or more smartstub clients 104. In an embodiment of the present invention, the segregated, organized and orchestrated data is delivered to the one or more smartstub clients 104 in an optimum and efficient manner. In an embodiment of the present invention, each smartstub client 104 receives data corresponding to the service transaction requests initiated by the consumer applications 112 and respective responses.

In an embodiment of the present invention, the one or more users may record additional service transactions using any other consumer application 112 by using another proxy agent 108 and providing corresponding service information (provided that another consumer application 112 is appropriately configured).

The system 100 enables the one or more users to record numerous service transactions originating from any consumer application 112 towards any service endpoint 110 of preference without the need to have a dedicated smartstub client 104 for the same service endpoint 110. The system 100 also facilitates recording service transactions that are originating from multiple consumer applications 112 as service requests towards the one or more service endpoints 110 at the same time using one or more smartstub clients 104.

In an embodiment of the present invention, the components of the system 100 are designed and implemented to support any remote service transaction recording scenario and facilitate virtual service creation using the recorded service transactions. In an embodiment of the present invention, all the components of the system 100 reside on the same machine. In another embodiment of the present invention, the components of the system 100 reside on different machines and communicate over a suitable network. In yet another embodiment of the present invention, some of the components of the system 100 reside on one machine and others on one or more different machines.

In an embodiment of the present invention, the system 100 implements a multipoint protocol bridging algorithm to record service transactions from various service endpoints 110 using different proxy agents 108 during run-time and transfer it to a specific proxy manager 106 in an optimized manner. The system 100 is capable of simultaneously receiving transaction data for multiple protocols, multiple service transactions and different scenarios. The different scenarios for which the algorithm enables the system 100 to receive transaction data include, but not limited to, development, unit testing, functional testing, performance testing and the likes.

In an exemplary embodiment of the present invention, the multipoint protocol bridging algorithm is described in detail below. The following data and configuration properties are considered and build:
   a. List of Proxy Agents 108 or Proxy Brokers 108
   PB={PB1,PB2,PB3,PB4, . . . , PBp}
     where, p is total number of Proxy Agents 108 or Proxy Brokers108
   b. List of Smartstub Clients 104—names for given connected clients 104

C={C1, C2, . . . , Cc}
   where,
   c is total number of smartstub clients 104 connected to proxy manager 106
   c. For each proxy broker p,
     PB(p)={S1, S2, . . . Sn}
     where,
     S is service endpoint 110 configured with each proxy Broker p
   d. T(pn) is set of Service Transaction Data (SD) recorded at proxy broker p for service service endpoint n
     T(pn)={SD1, SD2, . . . SDm}
     where, m is total number of data sets
     SD(j)={Map{P(t)→List(TD)}}
     where, $j \in [1, 2, \ldots, m]$ and
     $t \in [1, 2, \ldots, T]$
     P(t) is suported protocol t and
     List(TD)—listof Transaction data sets recorded at given Proxy Broker
   e. List of routing node R(p),
     R(p)={R1, R2, . . . Rk}
     where, R(p) is list of routing nodes for proxy Broker p and k is total number of routing nodes attached to proxy broker p Connection-routing graph/tree is built for all entities as discussed in following sections of the specification in conjunction with FIG. 1E.

Figure 1E:
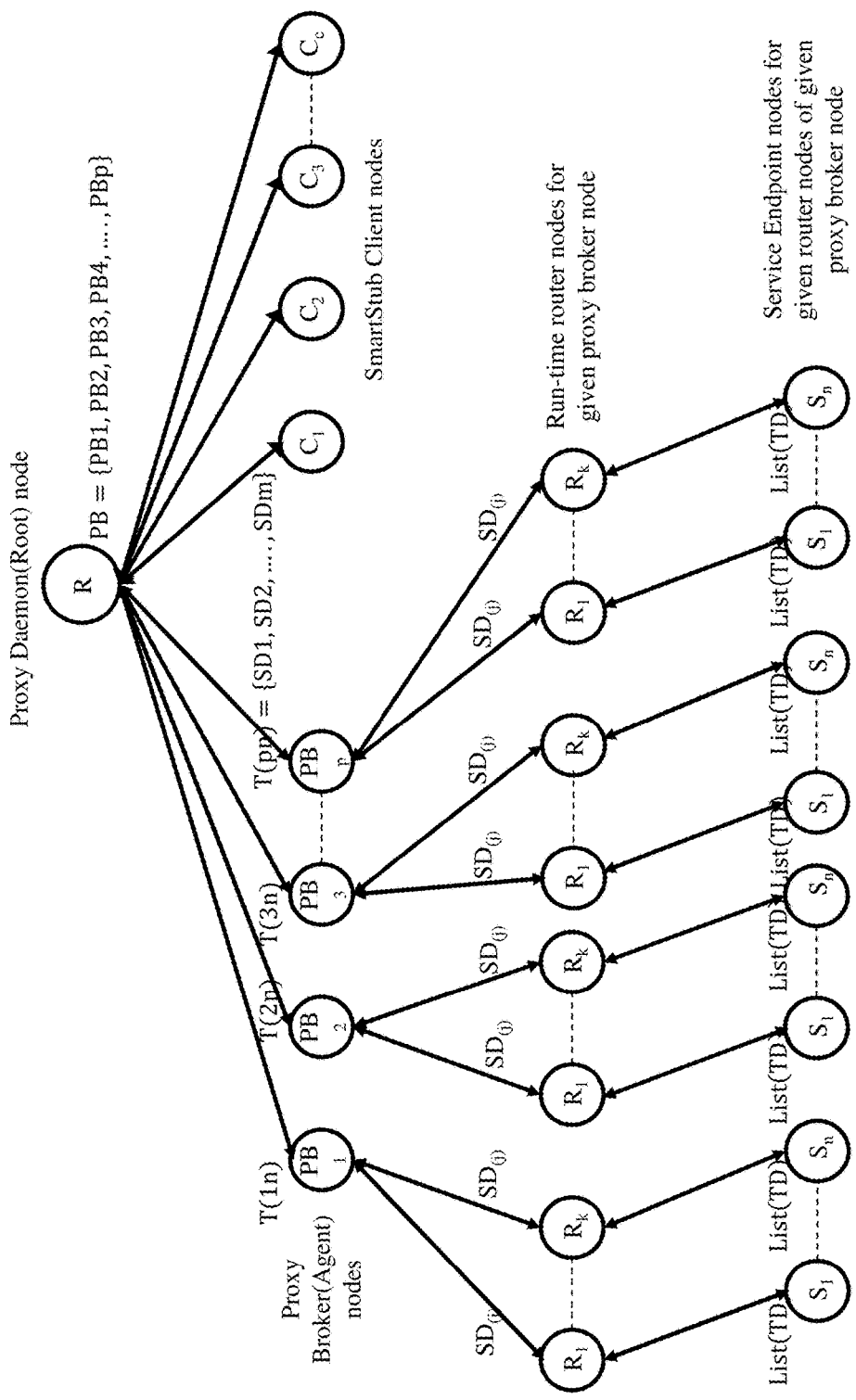
FIG. 1E is a directed graph/tree of proxy manager, proxy agents, smartstub client nodes, service endpoint nodes and other nodes, in accordance with an embodiment of the present invention.

FIG. 1E is a directed graph/tree of proxy manager 106, proxy agents 108, smartstub client nodes, service endpoint nodes and other nodes, in accordance with an embodiment of the present invention. The graph illustrated in FIG. 1E is discussed in detail below.

In an embodiment of the present invention, R is considered as the root element of the tree. R represents the proxy manager 106. The tree has different kinds of nodes such as, but not limited to, proxy broker nodes (represented as PB1-PBN in FIG. 1E), router nodes (represented as $R_1$-$R_k$ in FIG. 1E), service end-point nodes (represented as $S_1$-$S_n$ in FIG. 1E) and smartstub client nodes (represented as $C_1$-$C_c$ in FIG. 1E). During operation, proxy manager 106 and all deployed instances of proxy brokers 108 are started. Upon registration with the proxy manager 106, each new proxy broker 108 creates a proxy broker node along with information such as, but not limited to, node type (PB-Node), proxy broker name, proxy manager name, list of service endpoints hosts, list of proxy ports for each service endpoint and list of live ports for each service endpoint. Further, once connection with the proxy manager 106 is successful, a client node for each new smartstub client 104 is created along with information such as, but not limited to, Node type (C-Node), smartstub client name, proxy manager name, list of available smartstub proxy brokers and selected smartstub proxy broker. Furthermore, a new PB node with name same as proxy broker Identifier is created. The new PB node is considered as a sub-root node. The sub-root node is attached to the root node as a producer node. The PB{ } set is then updated. Also, for each new smartstub client, a new C node is created which is named same as corresponding smartstub client identifier. The new C node is considered as sub-root node and attached to the root node as consumer-node as illustrated in FIG. 1E. The set C{ } is then updated. For each new service endpoint configured at the proxy broker, a new R-node is created. The new R node is used to identify and dynamically route the incoming service request towards intended service endpoint during execution time. The set R(p) is then updated. Further, each R-Node is bridged with router-program/component of specific protocol type. Furthermore, each R node is designed to support specific protocol routing so that based on the routing type R-Node will be selected and control is delegated towards the same. On receiving specific commands from a particular smartstub client 104, proxy manager 106 communicates with the corresponding proxy broker 108 for the required transaction data and shares it with the smartstub client 104. The T(pn) and SD(j) are then updated wherein T(pn) is the set of service transaction data SD(j) recorded at the proxy broker p for service endpoint n.

The steps of executing the bridge, routing and data collection are discussed in detail below. The one or more proxy brokers 108 listen for incoming request with service endpoints to be bridged and routed at proxy broker node. The live service endpoint name within the connection-routing graph is searched using standard breadth first search algorithm. If host for target service endpoint is not found, then response with 'Not Found" error code is provided and live service endpoint name within the connection-routing graph is searched again. Once the host for target service endpoint is found, the control is delegate to R-Node of respective service endpoint. Further, connection with target service endpoint is created and response along with all other detail is received by the one or more proxy brokers 108. The received information is then shared with the proxy manager 106.

Figure 1F:
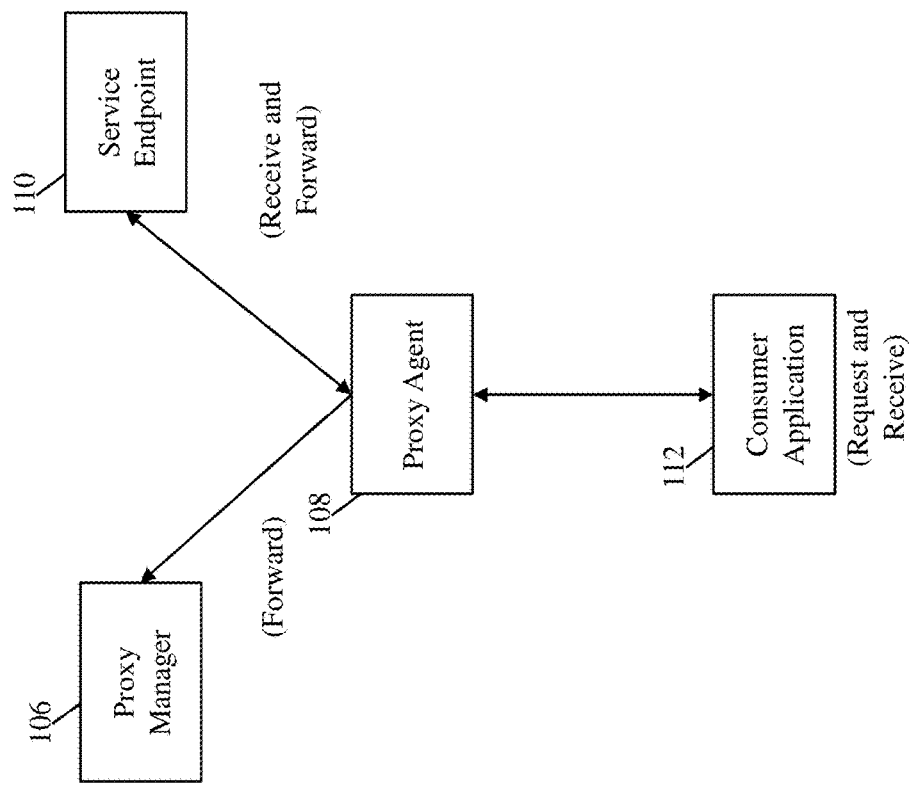
FIG. 1F illustrates control and data flow between various components of the system during recording of service transactions, in accordance with an embodiment of the present invention.

In an embodiment of the present invention, the one or more proxy agents 108 operate on the principle of fork wherein the proxy agents are at the centre of the fork and facilitate efficient and controlled handshaking among all the components of the system 100 as illustrated in FIG. 1F. FIG. 1F illustrates control and data flow between various components of the system 100 during recording of service transactions, in accordance with an embodiment of the present invention.

Figure 2:
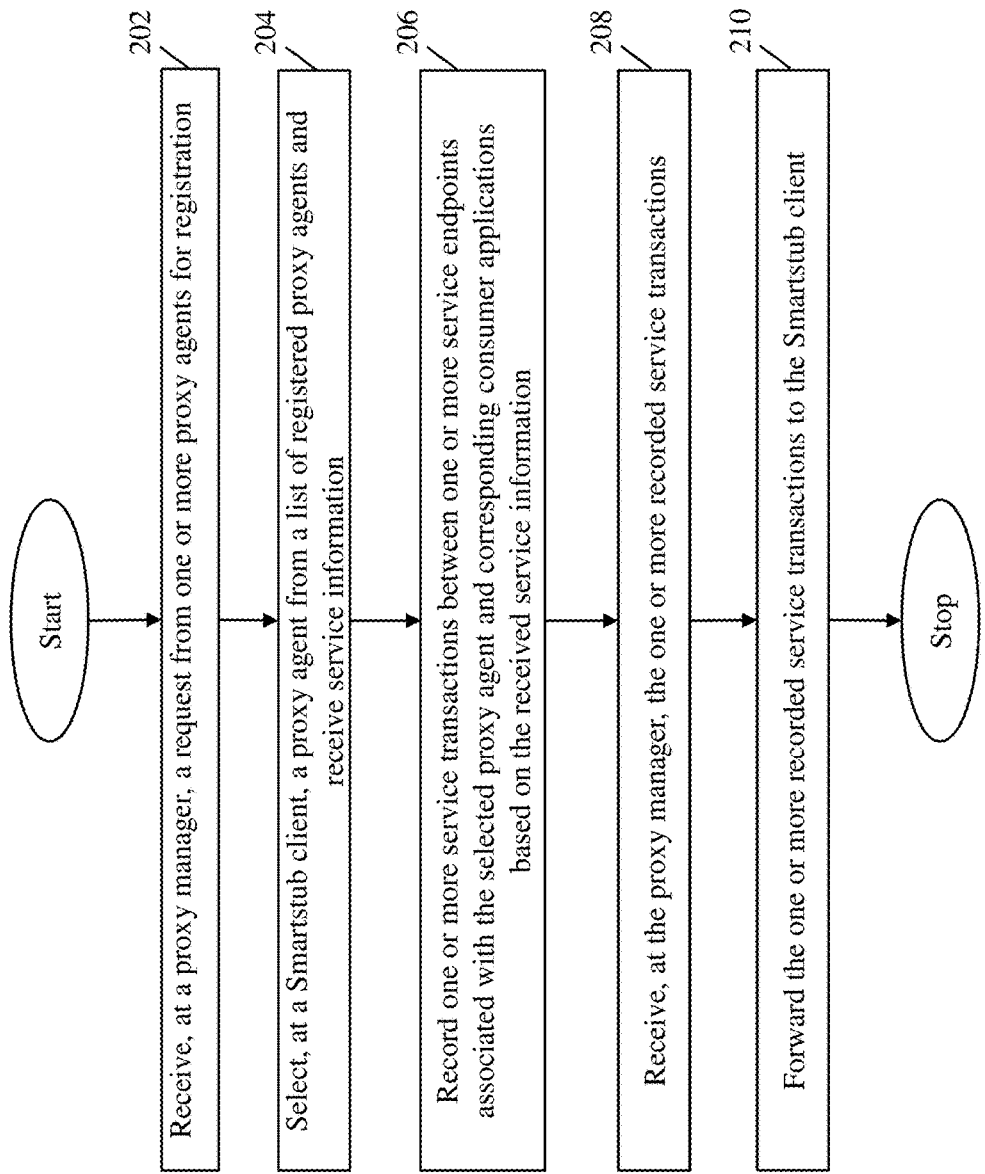
FIG. 2 is a flowchart illustrating a method for agent based centralized and efficient transaction recordings for service virtualization, in accordance with an embodiment of the present invention.

FIG. 2 is a flowchart illustrating a method for agent based centralized and efficient transaction recordings for service virtualization, in accordance with an embodiment of the present invention.

At step 202, a request from one or more proxy agents for registration is received. In an embodiment of the present invention, the request is received at a proxy manager. In an embodiment of the present invention, the proxy manager facilitates connection between one or more smartstub clients and the one or more proxy agents. The proxy manager further perform functions including, but not limited to, session management, audit services, monitoring services, data congregation services, data reconciliation services and managing licenses.

At step 204, one or more proxy agents from a list of registered proxy agents are selected. In an embodiment of the present invention, one or more users select the proxy agent via the one or more smartstub clients. In an embodiment of the present invention, the one or more users include, but not limited to, business users, testers and developers. The one or more users also provide service information. The service information facilitates connection with one or more service endpoints and corresponding one or more consumer applications. In an embodiment of the present invention, the service information includes, but not limited to, a protocol specification, an Internet Protocol (IP) address of service endpoint, a name of port hosting live service, requisite authentication information and requisite proxy information.

In an embodiment of the present invention, if the one or more proxy agents are not registered, then the one or more proxy agents act as a pass-through between the one or more service endpoints and the corresponding one or more consumer applications. In an embodiment of the present invention, the one or more selected proxy agents facilitate connection between the one or more service endpoints and the corresponding one or more consumer applications based on the received service information.

At step 206, each of one or more service transactions between the one or more service endpoints and the corresponding one or more consumer applications are simultaneously recorded based on the received service information. Further, the one or more service endpoints are connected with the one or more selected proxy agents. In an embodiment of the present invention, each of the one or more service transactions is performed using a specific protocol and service. Further, the specific protocol and service comprise Simple Object Access Protocol (SOAP), Representational State Transfer (REST), Java Message Service (JMS), Java Database Connectivity (JDBC), Remote Method Invocation (RMI), File Transfer Protocol (FTP), Hypertext Transport Protocol (HTTP) and Transport Control Protocol (TCP).

At step 208, the one or more recorded service transactions are received. The one or more recorded service transactions are received at the proxy manager. At step 210, the one or more recorded service transactions are forwarded to the one or more smartstub clients of the one or more users. In an embodiment of the present invention, the proxy manager forwards the one or more recorded service transactions to the one or more smartstub clients. The one or more smartstub clients further forward the one or more recorded service transactions to a smartstub server for future use.

In an embodiment of the present invention, a multipoint protocol bridging algorithm is used to record the one or more service transactions from the one or more service endpoints using different proxy agents at run-time. The multipoint protocol bridging algorithm also facilitates in optimally transferring the one or more recorded service transactions to the proxy manager.

Figure 3:
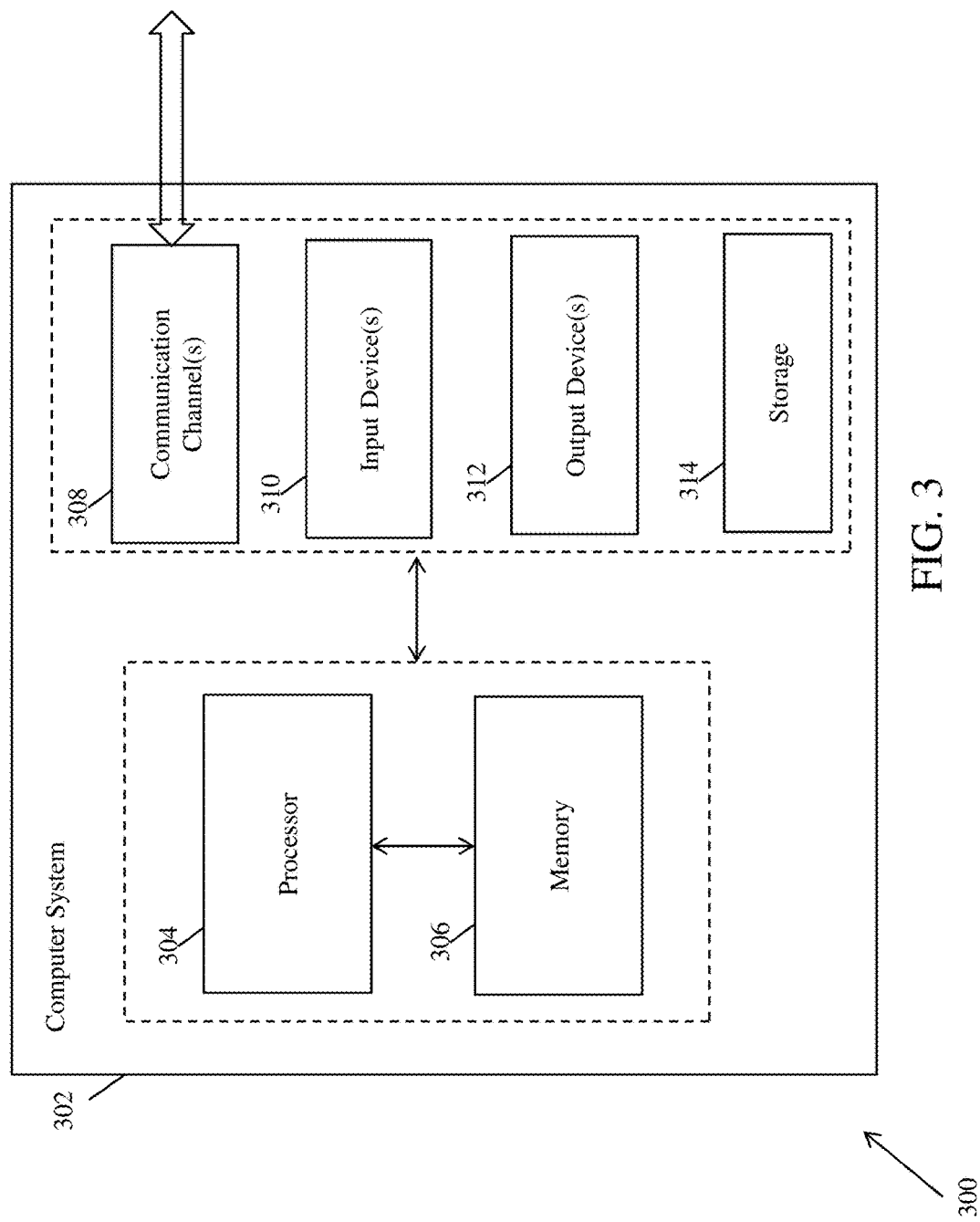
FIG. 3 illustrates an exemplary computer system for agent based centralized and efficient transaction recordings for service virtualization, in accordance with an embodiment of the present invention.

FIG. 3 illustrates an exemplary computer system for agent based centralized and efficient transaction recordings for service virtualization, in accordance with an embodiment of the present invention.

The computer system 302 comprises a processor 304 and a memory 306. The processor 304 executes program instructions and may be a real processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

I claim:

1. A system for agent based transaction recordings for service virtualization, the system comprising:
a proxy manager configured to receive a request from one or more proxy agents for registration, and wherein the proxy manager is further configured to perform functions comprising session management, audit services, monitoring services, data congregation services, data reconciliation services and managing licenses;
multiple smartstub clients configured to provide one or more options for:
selecting one or more proxy agents from a list of registered proxy agents; and receiving service information, wherein the received service information facilitates connection of the one or more selected proxy agents with multiple service endpoints and corresponding consumer applications; and
the one or more selected proxy agents configured to:
simultaneously record multiple service transactions between the multiple service endpoints and the corresponding consumer applications, wherein each of the service transactions are performed using different protocol types associated with the multiple service end-points; and
forward the multiple recorded service transactions to the proxy manager, wherein the proxy manager provides the recorded service transactions to the multiple smartstub clients for service virtualization.

2. The system of claim 1, wherein the proxy manager facilitates connection between the one or more smartstub clients and the one or more proxy agents.

3. The system of claim 1, wherein the service information comprises of at least a protocol specification, an Internet Protocol address of service endpoint, a name of port hosting live service, requisite authentication information and requisite proxy information.

4. The system of claim 1, wherein the one or more selected proxy agents facilitate connection between the one or more service endpoints and the corresponding one or more consumer applications.

5. The system of claim 1 further comprising a smartstub server configured to manage the one or more smartstub clients.

6. The system of claim 1, wherein each of the multiple service transactions is performed using a specific protocol and service.

7. The system of claim 6, wherein the specific protocol and service comprise Simple Object Access Protocol (SOAP), Representational State Transfer (REST), Java Message Service (JMS), Java Database Connectivity (JDBC), Remote Method Invocation (RMI), File Transfer Protocol (FTP), Hypertext Transport Protocol (HTTP) and Transport Control Protocol (TCP).

8. The system of claim 1, wherein if the one or more proxy agents are not registered with the proxy manager, then the one or more proxy agents act as a pass-through between the one or more service endpoints and the corresponding one or more consumer applications.

9. A computer-implemented method for agent based transaction recordings for service virtualization, via program instructions stored in a memory and executed by a processor, the computer-implemented method comprising:
receiving a request from one or more proxy agents for registration;
selecting one or more proxy agents from a list of registered proxy agents;
receiving service information, wherein the received service information facilitates connection of the one or more selected proxy agents with multiple service endpoints and corresponding consumer applications;
recording simultaneously multiple service transactions between the multiple service endpoints and the corresponding consumer applications wherein each of the service transactions are performed using different protocol types associated with the multiple service endpoints; and forwarding the multiple recorded service transactions to the multiple smartstub clients for service virtualization, wherein a proxy manager facilitates connection between the one or more smartstub clients and the one or more proxy agents, and the proxy manager is configured to perform functions comprising session management, audit services, monitoring services, data congregation services, data reconciliation services and managing licenses.

10. The computer-implemented method of claim 9, wherein the service information comprise a protocol specification, an Internet Protocol address of service endpoint, a name of port hosting live service, requisite authentication information and requisite proxy information.

11. The computer-implemented method of claim 9, wherein each of the multiple service transactions is performed using a specific protocol and service.

12. The computer-implemented method of claim 11, wherein the specific protocol and service comprise Simple Object Access Protocol (SOAP), Representational State Transfer (REST), Java Message Service (JMS), Java Database Connectivity (JDBC), Remote Method Invocation (RMI), File Transfer Protocol (FTP), Hypertext Transport Protocol (HTTP) and Transport Control Protocol (TCP).

13. The computer-implemented method of claim 9, wherein if the one or more proxy agents are not registered, then the one or more proxy agents act as a pass-through between the one or more service endpoints and the corresponding one or more consumer applications.

14. A computer program product for agent based transaction recordings for service virtualization, the computer program product comprising:

a non-transitory computer-readable medium having computer-readable program code stored thereon, the computer-readable program code comprising instructions that when executed by a processor, cause the processor to:

receive a request from one or more proxy agents for registration;

select one or more proxy agents from a list of registered proxy agents;

receive service information, wherein the received service information facilitates connection of the one or more selected proxy agents with multiple service endpoints and corresponding consumer applications;

record simultaneously multiple service transactions between the multiple service endpoints and the corresponding consumer applications, wherein each of the service transactions are performed using different protocol types associated with the multiple service endpoints; and forward the multiple recorded service transactions to the multiple smartstub clients for service virtualization, wherein a proxy manager facilitates connection between the one or more smartstub clients and the one or more proxy agents, and the proxy manager is configured to perform functions comprising session management, audit services, monitoring services, data congregation services, data reconciliation services and managing licenses.

* * * * *